(12) United States Patent
Islam et al.

(10) Patent No.: US 11,385,360 B2
(45) Date of Patent: Jul. 12, 2022

(54) SENSORS WITH VIRTUAL SPATIAL SENSITIVITY FOR MONITORING A RADIATION GENERATING DEVICE

(71) Applicant: University Health Network, Toronto (CA)

(72) Inventors: Mohammad Khairul Islam, Oakville (CA); Robert K. Heaton, Toronto (CA); David A. Jaffray, Etobicoke (CA); Bernhard Dieter Norrlinger, Mississauga (CA)

(73) Assignee: University Health Network, Toronto (CA)

( * ) Notice: Subject to any disclaimer, the term of this patent is extended or adjusted under 35 U.S.C. 154(b) by 0 days.

(21) Appl. No.: 15/578,743

(22) PCT Filed: Jun. 3, 2016

(86) PCT No.: PCT/CA2016/050635
§ 371 (c)(1),
(2) Date: Dec. 1, 2017

(87) PCT Pub. No.: WO2016/191883
PCT Pub. Date: Dec. 8, 2016

(65) Prior Publication Data
US 2018/0172845 A1  Jun. 21, 2018

Related U.S. Application Data

(60) Provisional application No. 62/171,806, filed on Jun. 5, 2015.

(51) Int. Cl.
*G01T 1/185* (2006.01)
*H01J 47/02* (2006.01)
*G01T 1/29* (2006.01)

(52) U.S. Cl.
CPC ............ *G01T 1/185* (2013.01); *G01T 1/2935* (2013.01); *H01J 47/02* (2013.01)

(58) Field of Classification Search
CPC ......... G01T 1/185; G01T 1/2935; H01J 47/02
See application file for complete search history.

(56) References Cited

U.S. PATENT DOCUMENTS

| 2,797,332 A | 6/1957 | Hill |
| 2,917,647 A | 12/1959 | Fowler et al. |

(Continued)

FOREIGN PATENT DOCUMENTS

| AU | 2007272248 B2 | 8/2013 |
| CA | 2657315 A1 | 1/2008 |

(Continued)

OTHER PUBLICATIONS

Simpson, Jr. Air Proportional Counters, The Review of Scientific Instruments, vol. 19, No. 11, pp. 733-743 (Year: 1948).*

(Continued)

*Primary Examiner* — David P Porta
*Assistant Examiner* — Shun Lee
(74) *Attorney, Agent, or Firm* — Bereskin & Parr LLP/S.E.N.C.R.L., s.r.l.; Tony Orsi

(57) ABSTRACT

Various embodiments are described herein for sensors that may be used to measure radiation from radiation generating device. The sensors may use a collector plate electrode with first and second collection regions having shapes that are inversely related with one another to provide ion chambers with varying sample volumes along a substantial portion of the first and second collection regions which provides virtual spatial sensitivity during use.

20 Claims, 10 Drawing Sheets

(56) References Cited

U.S. PATENT DOCUMENTS

| | | | |
|---|---|---|---|
| 3,852,610 A | 12/1974 | McIntyre | |
| 4,395,636 A * | 7/1983 | Anger | H01J 31/49 |
| | | | 250/366 |
| 4,590,401 A | 5/1986 | Goldstein et al. | |
| 4,803,368 A * | 2/1989 | Barthelmes | G01T 1/185 |
| | | | 250/374 |
| 4,859,854 A * | 8/1989 | Kershner | G01R 29/24 |
| | | | 250/374 |
| 4,954,710 A | 9/1990 | Comparat et al. | |
| 5,095,217 A | 3/1992 | Attix | |
| 5,511,549 A | 4/1996 | Legg et al. | |
| 5,572,118 A | 11/1996 | Lewis | |
| 5,627,367 A | 5/1997 | Sofield | |
| 6,714,620 B2 | 3/2004 | Caflisch et al. | |
| 2004/0096033 A1 | 5/2004 | Seppi et al. | |
| 2005/0056791 A1 | 3/2005 | Donaghue et al. | |
| 2005/0101824 A1 | 5/2005 | Stubbs | |
| 2010/0012829 A1 | 1/2010 | Islam et al. | |
| 2011/0315889 A1* | 12/2011 | Webster | G01T 1/2935 |
| | | | 250/375 |

FOREIGN PATENT DOCUMENTS

| | | |
|---|---|---|
| CN | 1553177 A | 12/2004 |
| EP | 0 838 844 A2 | 4/1998 |
| GB | 890741 A | 3/1962 |
| WO | 2005/081842 A2 | 9/2005 |
| WO | 2008/006198 A1 | 1/2008 |
| WO | 2014/065990 A1 | 5/2014 |

OTHER PUBLICATIONS

Sato et al. Position-sensitive ionization chamber for diffraction studies at synchrotron sources, Proceeding of SPIE vol. 3774, pp. 733-743 (Year: 1999).*
Extended European Search Report dated Jan. 3, 2019 issued in corresponding EP Patent Application No. 16802303.4.
Norrlinger et al., "Response Prediction of a Transmission Type Chamber for Verification of Step-and-Shoot IMRT", Princess Margaret Hospital and University of Toronto, Presented at the 46th AAPM Annual Meeting, Pittsburgh, Pennsylvania, USA, 2004 (standard poster display).
Paliwal et al., "A consistency monitor for radiation therapy treatments", Med Phys, 1996, 23(10): 1805-1807.
Norrlinger et al., "Characterization Of A Large-Area Transmission Chamber For Independent Verification Of IMRT Dose Delivery Constancy", Princess Margaret Hospital and University of Toronto, Presented at the 45th AAPM Annual Meeting, San Diego, California, USA, 2003 (standard poster display).
Ezzell et al., "The overshoot phenomenon in step-and-shoot IMRT delivery", Am. Coll. Med. Phys., 2001, 2(3):138-148.
International Search Report and Written Opinion dated Sep. 7, 2016 in corresponding International Patent Application No. PCT/CA2016/050635.
Islam, et al., "An integral quality monitoring system for real-time verification of intensity modulated radiation therapy", Med. Phys., 2009, 36(12): 5420-5428.
Lin, "Addressing Limitations of a Spatially Sensitive Large-Area Ion Chamber for Real-Time Verification of Intensity Modulated Radiation Therapy", M.A.Sc. Thesis, University of Toronto, Nov. 2015, 95 pages <https://tspace.library.utoronto.ca/handle/1807/70483>.
Webb, "Optimizing the planning of intensity-modulated radiotherapy", Phys. Med. Biol., 1994, 39(12): 2229-2246.
Boyer, et al., "Intensity-Modulated Radiation Therapy with Dynamic Multileaf Collimators", Semin. Radiat. Oncol., 1999, 9(1): 48-59.

Reinstein, et al., "A feasibility study of automated inverse treatment planning for cancer of the prostate", Int. J Radiat. Oncol. Biol. Phys., 1998, 40(1): 207-214.
Burman, et al., "Planning, delivery, and quality assurance of intensity-modulated radiotherapy using dynamic multileaf collimator: a strategy for large-scale implementation for the treatment of carcinoma of the prostate", Int. J. Radiat. Oncol. Biol. Phys., 1997, 39(4): 863-873.
Poppe, et al., "DAVID—a translucent multi-wire transmission ionization chamber for in vivo verification of IMRT and conformal irradiation techniques", Phys. Med. Biol., 2006, 51(5): 1237-1248.
Examination Report dated Feb. 19, 2018 in related EP Patent Application No. 07763872.4.
Venkataraman, et al., "The influence of a novel transmission detector on 6 MV x-ray beam characteristics", Phys. Med. Biol., 2009, 54(10): 3173-3183.
Goulet, et al., "Real-time verification of multileaf collimator-driven radiotherapy using a novel optical attenuation-based fluence monitor", Med. Phys., 2011, 38(3): 1459-1467.
Chang, et al., "A Method for Online Verification of Adapted Fields Using an Independent Dose Monitor", Med. Phys., 2013, 40(7): 072104-1 to 072104-8.
International Search Report and Written Opinion dated Oct. 29, 2007 in related International Patent Application No. PCT/CA2007/001209.
International Preliminary Report on Patentability dated Jan. 13, 2009 in related International Patent Application No. PCT/CA2007/001209.
Office Action dated Apr. 13, 2011 in related U.S. Appl. No. 12/373,159.
Final Office Action dated Sep. 30, 2011 in related U.S. Appl. No. 12/373,159.
Notice of Allowance dated Dec. 23, 2011 in related U.S. Appl. No. 12/373,159.
Examiner's Report dated Mar. 30, 2012 in related AU Patent Application No. 2007272248.
Office Action dated Sep. 2, 2011 in related CA Patent Application No. 2,657,315.
Office Action dated Feb. 6, 2014 in related CA Patent Application No. 2,657,315.
Office Action dated Feb. 24, 2015 in related CA Patent Application No. 2,657,315.
Office Action dated Feb. 16, 2016 in related CA Patent Application No. 2,657,315.
Notice of Allowance dated Jan. 23, 2018 in related CA Patent Application No. 2,657,315.
Extended European Search Report dated May 13, 2014 in related EP Patent Application No. 07763872.4.
Examination Report dated Feb. 27, 2014 in related EP Patent Application No. 07763872.4.
Notice of Publication dated Mar. 11, 2009 in related EP Patent Application No. 07763872.4.
Knoll, "Radiation Detection and Measurement", John Wiley and Sons Inc., New York, NY (1989), pp. 80-85, 182-185, and 190-195.
Examination Report dated Apr. 21, 2021 in EP Patent Application No. 16802303.4 (5 pages).
Sato, "A position-sensitive ionization chamber for XAFS studies at synchrotron sources", J Synchrotron Radiat., Mar. 1, 2001, 8(Pt 2): 378-380.
Attix, Chapter 15, in "Introduction to Radiological Physics and Radiation Dosimetry", WILEY-VCH Verlag GmbH & Co. KGaA, Weinheim, Germany, 2004, pp. 438-443.
Knoll, "Radiation Detection and Measurement", Third Edition, John Wiley and Sons, Inc., New York, NY (2000), pp. 129-157 and 159-199.
Seco et al., "Review on the characteristics of radiation detectors for dosimetry and imaging", Phys. Med. Biol., 2014, 59(20): R303-R347.

* cited by examiner

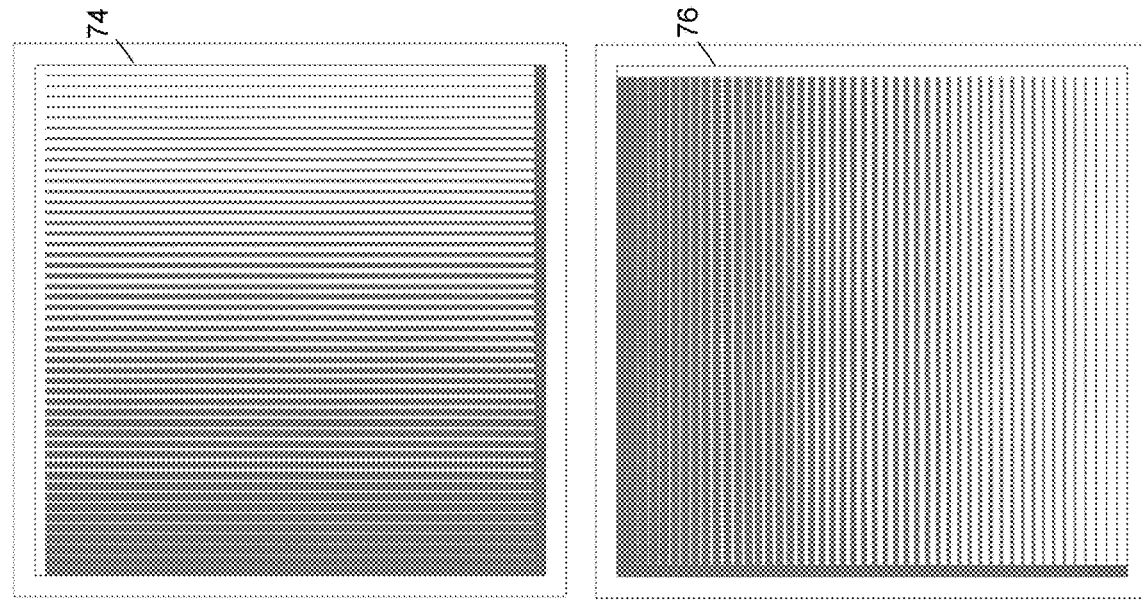
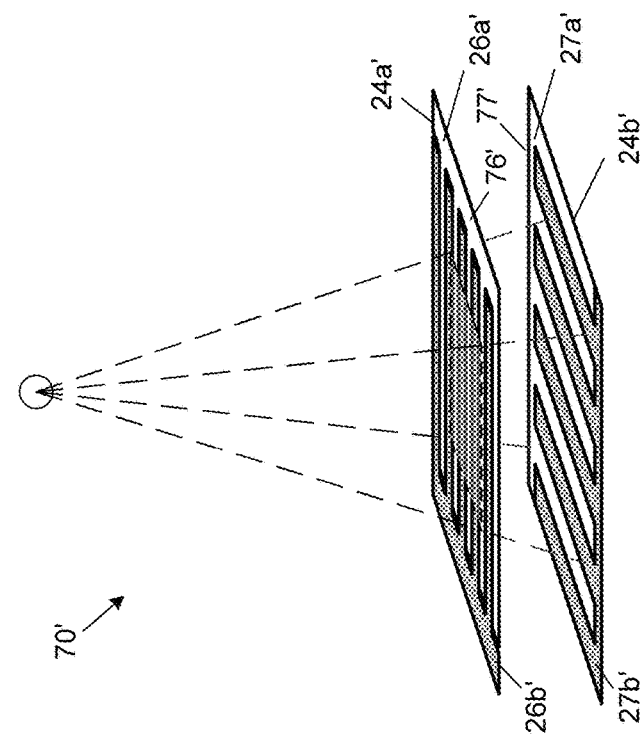
FIG. 6C
FIG. 6B

SENSORS WITH VIRTUAL SPATIAL SENSITIVITY FOR MONITORING A RADIATION GENERATING DEVICE

CROSS-REFERENCE TO RELATED APPLICATIONS

This application is a 35 USC § 371 national stage entry of International Patent Application No. PCT/CA2016/050635 filed Jun. 3, 2016, which claims priority to U.S. Provisional Patent Application No. 62/171,806 filed Jun. 5, 2015. The entire contents of each application are hereby incorporated by reference.

FIELD

Various embodiments are described herein that generally relate to sensors having ion chambers with virtual sensitivity gradients for measuring radiation from a radiation generating device used in a variety of different applications.

BACKGROUND

The design and delivery of high precision radiation therapy techniques, such as Intensity Modulated Radiotherapy (IMRT) and Volumetric Modulated Arc Therapy (VMAT) involve complex software and hardware systems. The radiation treatment plan may be generated using sophisticated optimization methods to deliver a prescribed dose to a target volume, while minimizing the dose to critical normal tissue[1,2,3]. A complex radiation treatment plan is specified by a large number of parameters such as: beam energy, multiple field apertures defined by Multi-leaf Collimators (MLC), collimator angle, gantry angle and the dose rate that is applied to the patient by the dynamic treatment delivery control system[4].

The processes of radiation treatment plan development, data transfer to the Record & Verify system, and finally the delivery of the intended plan on the treatment unit involve multiple steps, multiple personnel and often multiple software systems. To ensure accuracy of the radiation dose delivery and to minimize errors, each radiation therapy beam is usually verified once before the start of a treatment course using traditional tools & methods; however, this involves a significant amount of machine and staff time.

Due to the complexity of the overall process and equipment, errors in radiation treatment delivery may be introduced after the initial beam delivery verification; however, no subsequent independent delivery checks are typically performed during a multi-week, multi-fraction treatment course. To address this deficiency, several systems have been proposed in recent years as on-line (or real-time) beam delivery Quality Assurance (QA) systems[5-9] and these systems may use a radiation sensor having an ion chamber to perform measurements for quality assurance.

SUMMARY OF VARIOUS EMBODIMENTS

In a broad aspect, at least one embodiment described herein provides a sensor for measuring a radiation dose, wherein the sensor comprises a first polarizing plate electrode; a collector plate electrode spaced apart from the first polarizing plate electrode and having a first surface directed towards the first polarizing plate electrode, the first surface comprising first and second interleaved collection regions that are electrically isolated from one another and each comprise a conductor that increases in size across a portion of the collector plate defining first and second ion chambers with a varying sampling volume across the first and second collection regions to provide a virtual spatial gradient; and a gas or liquid located within the ion chambers; wherein the collector plate electrode detects ions generated within the ion chambers when the sensor is subjected to an ionizing radiation beam.

In at least one embodiment, the virtual spatial gradients of the first and second ion chambers may monotonically increase in opposed directions to provide first and second ion signals during use that are complementary to one another.

In at least one embodiment, a detection signal for the sensor is based on one of the first and second ion signals or a summation of the first and second ion signals.

In at least one embodiment, the sensor may comprise a second polarizing plate electrode and the collector plate electrode may be disposed between the first and second polarizing plate electrodes.

In at least one embodiment, the collector plate electrode may have a second surface opposite the first surface, the second surface comprising third and fourth interleaved collection regions that are electrically isolated from one another and each comprise a conductor that increases in size across a portion of the second surface of the collector plate defining third and fourth ion chambers with a varying sampling volume across the third and fourth collection regions to provide a second virtual volume gradient.

In at least one embodiment, the polarizing plate electrode has a second surface opposite the first surface of the collector plate electrode, the second surface comprising third and fourth interleaved collection regions that are electrically isolated from one another and each comprise a conductor that increases in size in opposite directions across a portion of the second surface of the additional collector plate defining third and fourth ion chambers with a varying sampling volume across the third and fourth collection regions to provide a second virtual gradient.

In at least one embodiment, the conductors of the first and second collection regions may vary along a first direction and the conductors of the third and fourth collection regions vary along a second direction that is orthogonal to the first direction.

In at least one embodiment, the conductors of the first and second collection regions may have a first shape and the conductors of the third and fourth collection regions may have a similar shape and may be rotated with respect to the conductors of the first and second collection regions to provide orthogonality.

In at least one embodiment, the conductors of the first and second collection regions may have a first shape and the conductors of the third and fourth collection regions may have a second shape that is different than the first shape.

In at least one embodiment, the conductors of the first and second collection regions may form an interdigitated shape where the conductors form pairs of interleaved rectangular tines with each pair of interleaved tines collectively having a width that is substantially constant along the collector plate electrode.

In at least one embodiment, the tines from the first conductor may decrease in width across the pairs of tines and the tines from the second conductor may increase in width across the pairs of tines.

In at least one embodiment, the conductors of the first and second collection regions may form an interdigitated shape where the conductors form pairs of interleaved triangles in a sawtooth configuration with each pair of interleaved triangles collectively having a width that is substantially constant along the collector plate electrode.

In at least one embodiment, the collector and electrode plates may be arranged in a parallel configuration.

In at least one embodiment, the collector and electrode plates may be arranged at an angle to one another to provide a physical spatial gradient in addition to the virtual spatial gradient for the ion chambers.

In at least one embodiment, the gas in the ion chambers may comprise air.

In at least one embodiment, the ion chambers may be at room pressure or at a pressure greater than room temperature.

In at least one embodiment, the sensor may comprise at least one of a temperature sensor to obtain temperature measurements that can be used to perform temperature compensation on the radiation dose measurement and a pressure sensor to obtain pressure measurements that can be used to perform pressure compensation on the radiation does measurement.

In at least one embodiment, the collector plate electrode may comprise a printed circuit board and the first and second collection regions are formed by etching a conductive surface of the printed circuit board.

In at least one embodiment, the collector plate electrode may comprise an insulator and the conductors of the first and second collection regions are deposited on a surface of the insulator.

In at least one embodiment, the insulator may comprise glass or plastic.

In a broad aspect, at least one embodiment described herein provides a sensor for measuring a radiation dose, wherein the sensor comprises a polarizing plate electrode; a collector plate electrode spaced apart from the polarizing plate electrode and having a first surface directed towards the polarizing plate electrode, the first surface comprising first and second collection regions that are conductive, electrically isolated from one another and have a shape with a dimension that changes inversely with respect to one another across a portion of the collector plate to define first and second ion chambers with a linearly varying sampling volume that are used to measure radiation; and a gas or liquid located within the ion chambers; wherein the collector plate electrode detects ions generated within the ion chambers when the sensor is subjected to an ionizing radiation beam.

In at least one embodiment, the widths of the first and second conductors may vary inversely with respect to one another across the portion of the collector plate.

In at least one embodiment, the sensor may have a cross section that is larger than a cross section of a radiation beam that is being measured by the sensor during use.

In another broad aspect, at least one embodiment described herein provides a use of a sensor in an Integral Quality Monitoring system, wherein the sensor is defined according to any one of the embodiments described in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 6B shows another alternative example embodiment of a modified sensor having upper and lower electrode plates in a parallel plate configuration where both of the plates have interleaved collection regions on surfaces that face one another to create 4 collection regions (the top surface of the top collector plate has been removed to show the collection regions on the bottom surface of the top collector plate).

FIGS. 6C-6F show various alternative example embodiments of the two surfaces of the collector plate of FIG. 6A.

Figure 1:
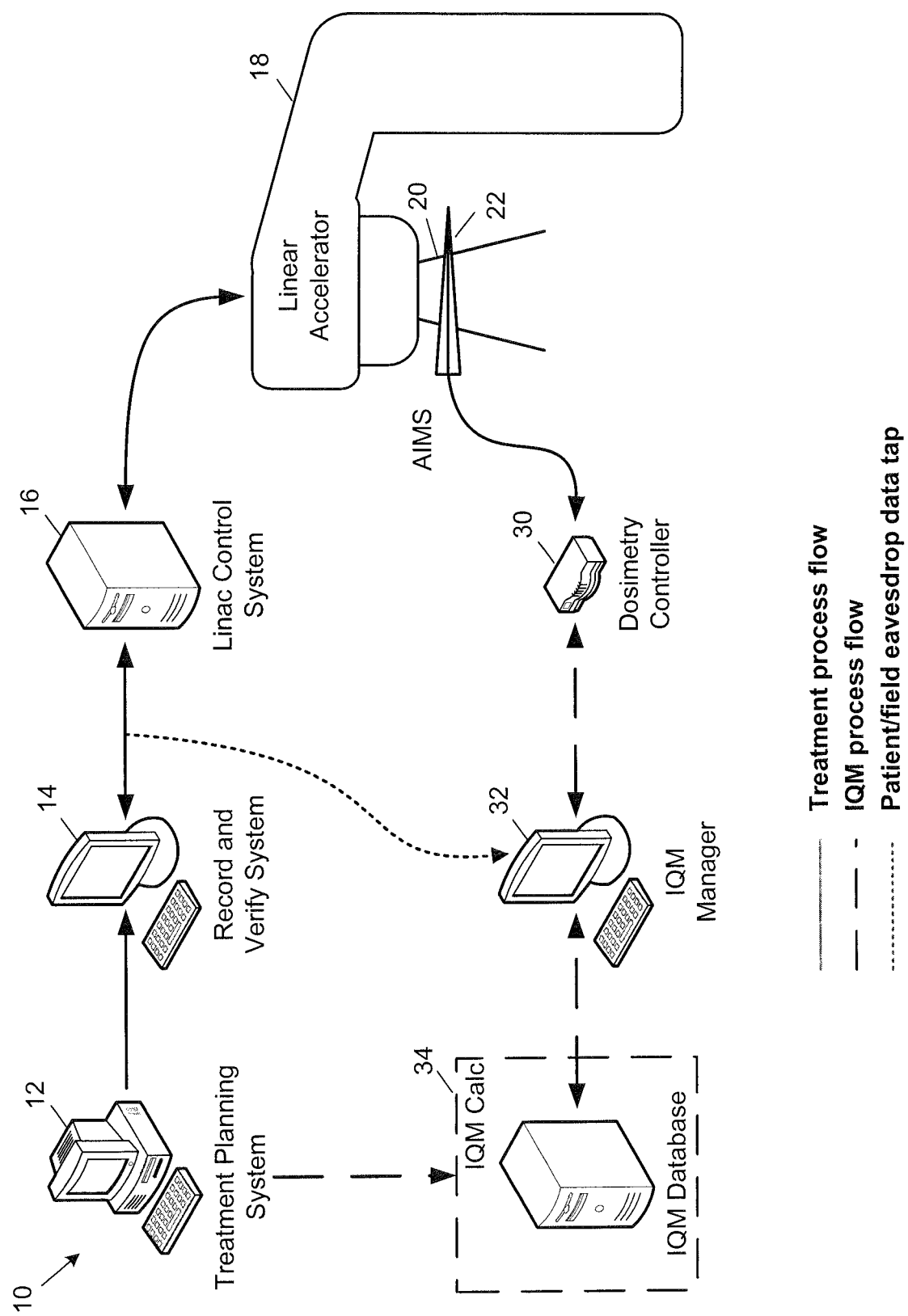
FIG. 1 is a block diagram showing an example workflow of an Integral Quality Monitoring (IQM) system.

Further aspects and features of the example embodiments described herein will appear from the following description taken together with the accompanying drawings.

DETAILED DESCRIPTION OF THE EMBODIMENTS

Various systems, devices or methods will be described below to provide an example of at least one embodiment of the claimed subject matter. No embodiment described herein limits any claimed subject matter and any claimed subject matter may cover systems, devices or methods that differ from those described herein. The claimed subject matter is not limited to systems, devices or methods having all of the features of any one process or device described below or to features common to multiple or all of the systems, devices or methods described herein. It is possible that a system, device or method described herein is not an embodiment of any claimed subject matter. Any subject matter that is disclosed in a system, device or method described herein that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two or more elements or devices can be directly connected to one another or connected to one another through one or more intermediate elements or devices via an electrical element, an electrical signal or a mechanical element depending on the particular context. Furthermore, the term "communicative coupling" indicates that an element or device can electrically, optically, or wirelessly send data to or receive data from another element or device according to the embodiment.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should also be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 10%, for example.

The example embodiments of the systems, devices or methods described in accordance with the teachings herein may be implemented as hardware or a combination of hardware and software. For example, the embodiments described herein may be used with systems that are implemented, at least in part, by using one or more computer programs, executing on one or more programmable devices comprising at least one processing element, and at least one data storage element (including volatile and non-volatile memory and/or storage elements). These systems may also have at least one input device (e.g. a keyboard, a mouse, a touchscreen, and the like), and at least one output device (e.g. a display screen, a printer, a wireless radio, and the like) depending on the nature of the device.

It should also be noted that there may be some elements that are used to implement at least part of the system components described herein that may be implemented via software that is written in a high-level procedural language such as object oriented programming. The program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a computing device that is readable by a general or special purpose programmable device having a processor, an operating system and the associated hardware and software that is necessary to implement the functionality of at least one of the embodiments described herein. The software program code, when read by the computing device, configures the computing device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

An example of a QA system for checking for errors in radiation treatment delivery that may be introduced after beam delivery verification is the Integral Quality Monitoring (IQM) system[6,9] that was developed to independently validate the accuracy of treatment beam delivery for daily radiation therapy. The IQM system includes a sensor having a spatially sensitive large area ion chamber, mounted at the beam collimator, and a software system to compare measured and expected signals. The expected signal may be calculated based on the beam parameters derived from the approved treatment plan based on a signal integration technique[6]. The IQM system produces unique signals in response to a segment of a radiation field passing through the ion chamber of a sensor and this signal may be described as a "spatially dependent dose-area-product". The system may be designed to work as an independent dose verification system that is simple to use and requires minimal user interaction.

An example workflow for an example embodiment of an IQM system 10 is shown schematically in FIG. 1. The IQM system 10 can be considered to be an Area Integrated Monitoring System (AIMS). In this example, the IQM system 10 comprises a treatment planning system 12, a record and verify system 14, a linac control system 16, a linear accelerator 18, an Area Integrated Monitoring sensor (having an ion chamber) 22, a dosimeter controller 30, an IQM manager 32 as well as an IQM calculator and IQM database 34. The IQM manager 32 may be used to automatically compare the measured and expected signal of radiation dose to validate the radiation beam delivery. The head of the linear accelerator 18 produces a radiation beam 20 during use that is directed towards the patient table (not shown) and the sensor 22 is disposed between the head of the linear accelerator and the patient table to receive all of the radiation beam 20 (e.g. the sensor 22 is larger than the cross-section of the radiation beam that is incident on it) in order to more accurately measure the dose of the radiation beam 20.

The sensor 22 of the IQM system 10 uses aluminum plate electrodes and the spatial sensitivity (i.e. gradient) was created by introducing a physical slope in the separation between the polarizing-voltage electrode plate and the current collecting electrode plate. The resulting physical wedge shaped collection volume of the sensor 22 generates a linearly varying signal which depends on the position of the radiation field on the sensor 22. However, since the sensor 22 is made out of Aluminum, it blocks the simulated radiation-field light (located in the head of the linear accelerator 18) and occupies a significant (~5 cm) space at the radiation collimator. This causes two limitations: (a) Radiation Therapists will need to remove the sensor 22 for a patient set-up using the field-light which increases the treatment time for each patient, and (b) the extra space occupied by the device attached to the collimator may limit the amount of clearance space between the patient and the treatment unit in combination with the mounted device for some special techniques and large patients. The special techniques may include a patient requiring support accessories or a patient needing to be positioned on the couch off-centre.

Radiation sensors that address these limitations may lead to wider adoption and routine use of the verification system in the radiation therapy community. To address these limitations several modified radiation sensors (i.e. detectors) comprising modified ion chambers that use a modified spatially encoding dose-area product transmission chamber (i.e. ion chamber) are provided in accordance with the teachings herein. The modified ion chambers are generally large-area virtual spatial gradient ion chambers that result from a modified design for the collector plate to achieve the spatial sensitivity gradient without having a physical gradient (slope) in the separation between the polarizing and collecting electrode plates. Accordingly, the modified collector plate may be used in parallel plate ion chambers and still achieve the spatial sensitivity gradient. At least some of the modified ion chambers described in accordance with teachings herein provide an effective method to monitor the delivery of external beam radiotherapy.

In one aspect, at least one of the sensor embodiments described herein have modified ion chambers may also use a modified collector plate that achieves a spatial gradient while having a uniform electrode separation and provides measurements from complementary spatial gradients thereby achieving uniform sensitivity along a substantial portion of the sensor.

The two complementary ion signals that are generated during radiation measurements when using a modified sensor in accordance with the teachings herein may be measured using two sets of electrometers (to collect independent signals). The data acquisition software is configured to collect the two sets of data obtained from the two complementary ion signals. In order to use the two data sets some mathematical manipulation may be performed so that the data may be combined into a final measurement signal.

In another aspect, at least one of the sensor embodiments described herein having modified ion chambers in accordance with the teachings herein may have a thinner width compared to conventional radiation sensors that only use a physical volume gradient.

In another aspect, at least one of the sensor embodiments described herein having modified ion chambers in accordance with the teachings herein may use materials that allow for light transmission with minimal attenuation and refraction.

In another aspect, at least one of the sensor embodiments described herein having modified ion chambers in accordance with the teachings herein may have a thinner width compared to conventional sensors that only use a physical volume gradient and may use materials that allow for light transmission with minimal attenuation and refraction.

It should be noted that the sensors described in accordance with the teachings herein may be used to measure radiation from various radiation generating devices that may be used in various applications such as, but not limited to, imaging, food sterilization, security, for example.

Figure 2:
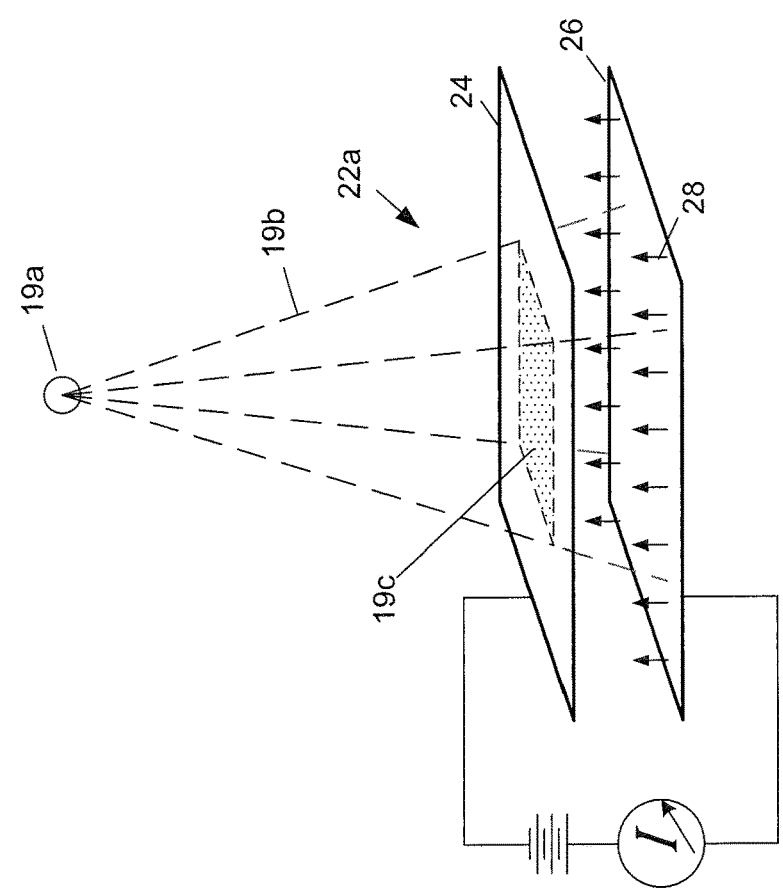
FIG. 2 shows an example embodiment of a conventional sensor having an ion chamber defined by two conducting plates in a parallel plate configuration separated by an air gap.

Referring now to FIG. 2, shown therein is an example embodiment of a conventional sensor 22a that has a parallel plate construction and comprises two conducting plates 24 and 26 that are separated by an air gap and define an ion chamber between them. A polarizing bias voltage is applied between the two plates 24 and 26, resulting in electric field lines 28 that are generally perpendicular to the two plates 24 and 26 and any ion charges in the air gap move based on the sign of their charge. Radiation from a point source 19a diverges as a radiation beam 19b and intersects an area 19c on one of the plates (in this case plate 24 which is the polarizing plate or polarizing electrode). The portion 19c of the radiation beam 19b that intersects the plate 24 may be detected by measuring the charge current created when ionizing radiation deposits energy in the air gap, resulting in positive and negative ions which drift across the air gap and function as charge carriers to complete the electric circuit. A suitable electrometer may be included in the circuit to measure the current or accumulated charge. The collected charge is proportional to the total amount of absorbed radiation dose in the ionizing medium.

Figure 3:
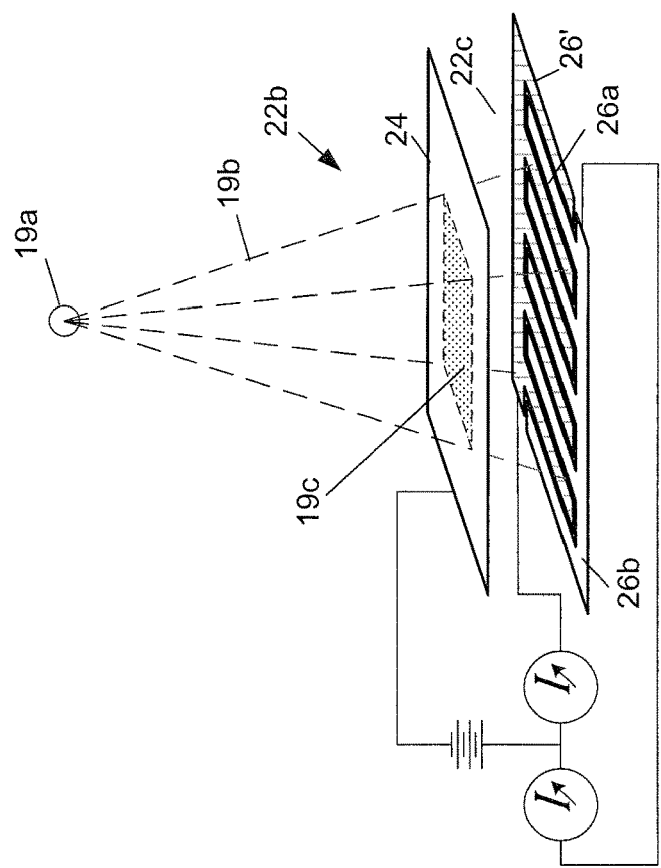
FIG. 3 shows an example embodiment of a modified sensor having ion chambers with a virtual spatial gradient in which radiation generated charge signals collected during use are partitioned using two electrically isolated collection regions on a collector plate.

Referring now to FIG. 3, shown therein is an example embodiment of a sensor 22b with a modified ion chamber 22c in which any radiation generated charge signals collected during use are partitioned using two electrically isolated collection regions 26a and 26b on a collector plate 26'. The two electrically isolated collection regions 26a and 26b have patterns with features that vary along the length of the ion chamber 22c which result in a virtual spatial gradient in sensitivity for the ion chamber 22c.

The sensor 22b may be used in the IQM system 10 in which case additional electronics are added to support the extra features.

The use of two interleaved patterns on a surface of a collector plate, in accordance with the teachings herein, results in straighter electric fields through the elimination of the angle between the electrode plates. The space defined by the electric fields associated with one of the collection regions between the collector plate and the polarizing plate defines a volume for the ion chamber and since the collection regions vary in geometry, there is a gradient in the volume of the ion chamber associated with each collection region along the length of the sensor 22b which results in a varying sampling volume during use. The result are ion chambers with virtual spatial gradients (i.e. virtual sampling volume) since the physical position between the polarizing plate 24 and the collecting plate 26' is relatively constant. The virtual spatial gradients are opposite in direction since the patterns in the first and second collection regions are inversely related to one another. In other words, the patterns in the first collection region varies along a first direction and the patterns in the second collection region vary in a second direction that is opposite of the first direction.

Figure 4A:
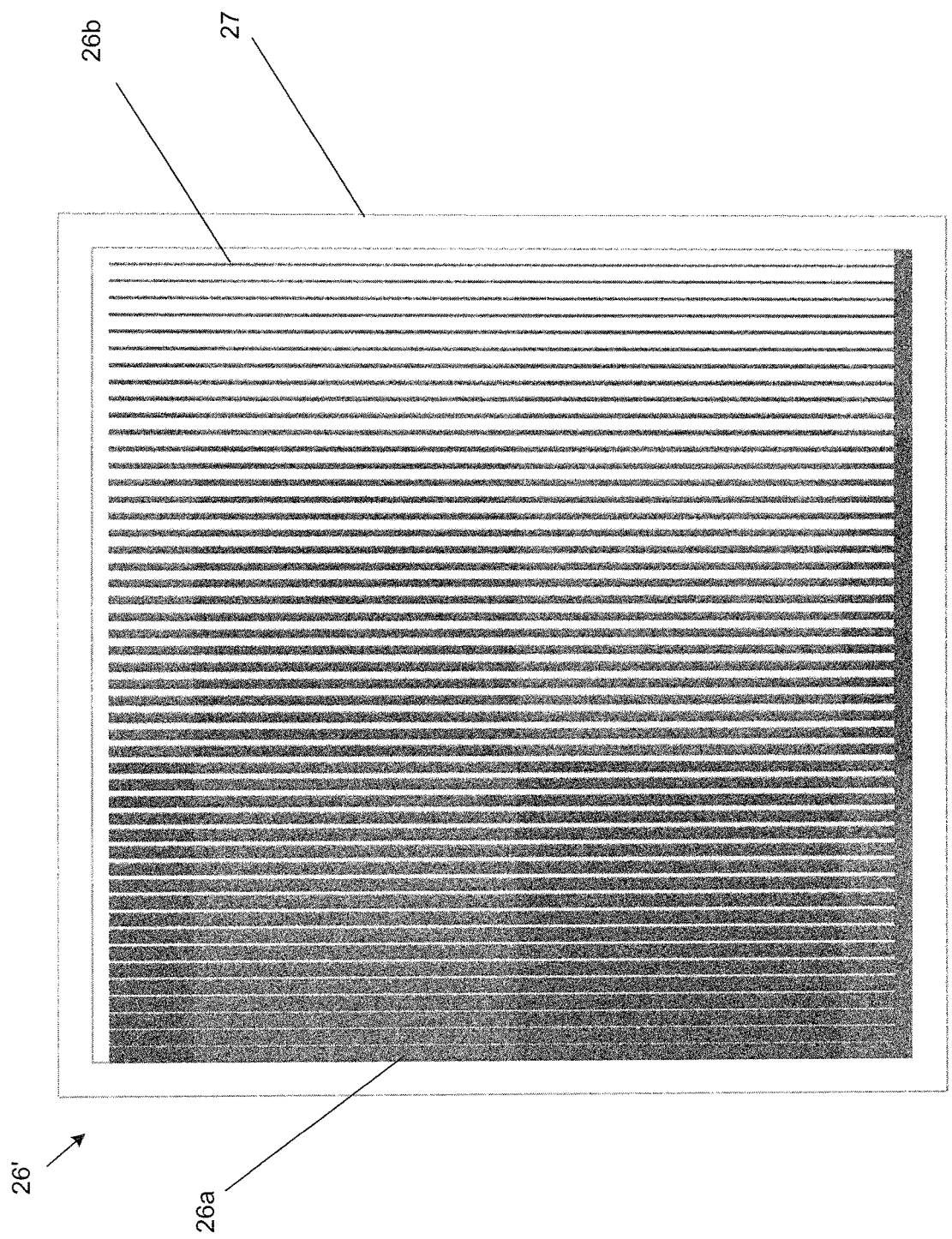
FIG. 4A shows a schematic representation of a comb pattern used to provide a virtual spatial gradient for the collector plate and during use signal strength is proportional to the width of the individual tine immediately overtop the volume containing the ions generated due to an incoming radiation beam.
Figure 4C:
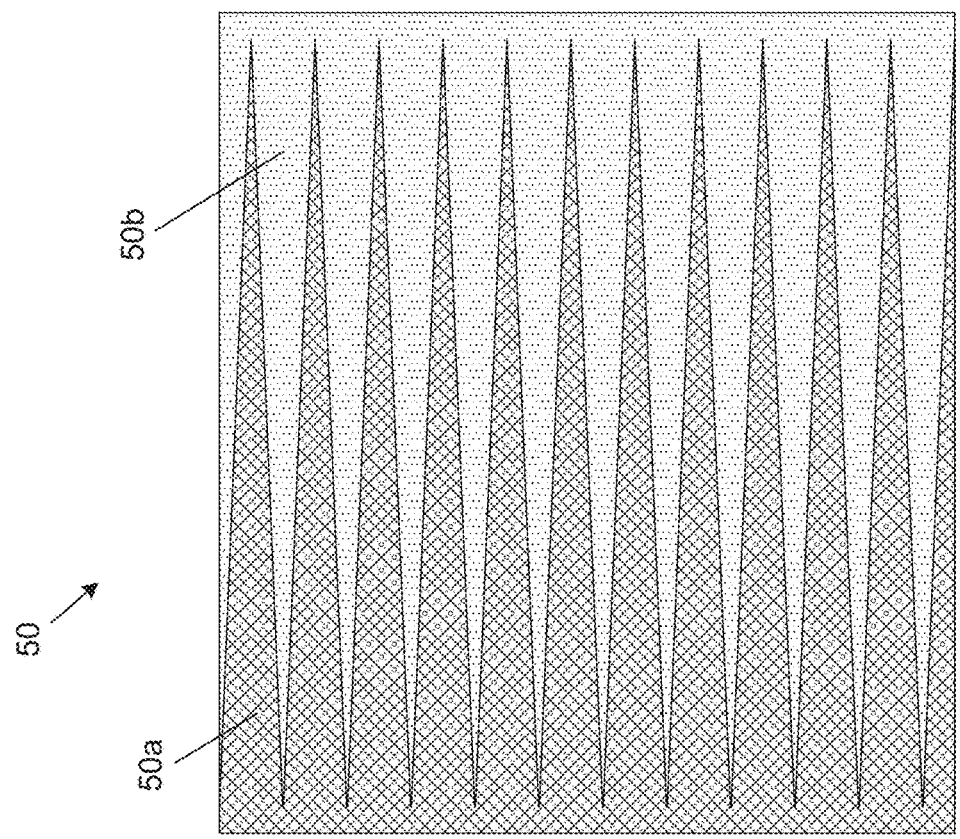
FIG. 4C shows an example embodiment of another alternative electrode comb pattern that may be used to achieve a virtual spatial gradient in which separate interleaved sawtooth collection regions are used.
Figure 4B:
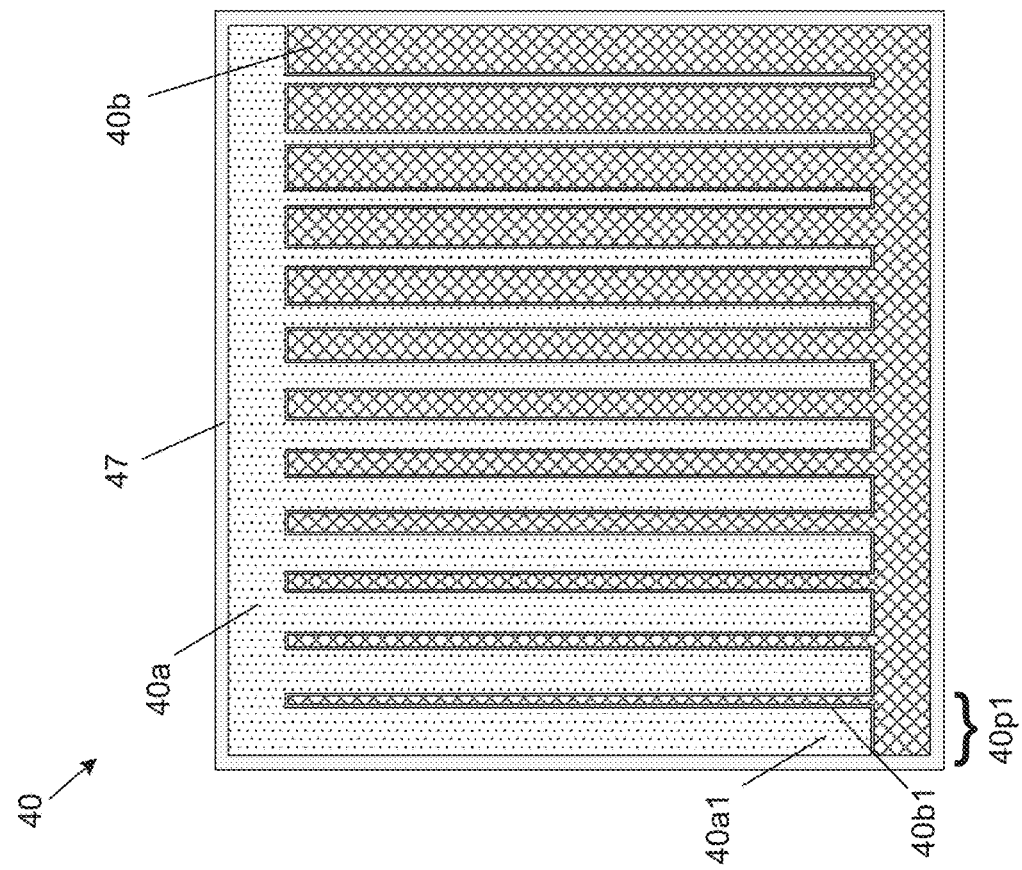
FIG. 4B shows an example embodiment of an alternative electrode comb pattern that may be used to achieve a virtual spatial gradient in which the same gradient direction signal is generated in the separate interleaved collection regions as in FIG. 4A.

In the example embodiment of FIG. 3, the virtual spatial sensitivity gradient is provided by using collection regions 26a and 26b that together form interleaved comb-patterned ion chambers with pairs of progressively increasing/decreasing tine widths as shown schematically in FIGS. 4A and 4B (see pair 40p1 having tines 40a1 and 40b1 in FIG. 4B for an example). For example, the spatial gradient for ion sensitivity may be achieved by changing the width of the tines in one of the collection regions linearly with position in a first direction while the other collection region with the complementary interleaved pattern varies in the reversed pattern (i.e. along a second direction that is opposite to the first direction).

Since the collection regions 26a and 26b are electrically isolated from one another, each collection region 26a results in an ion chamber and therefore the sensor 22b comprises two ion chambers. The collection regions 26a and 26b may be electrically isolated from one another by using an insulator between them or the collection regions 26a and 26b may be formed using conductive traces that do not touch one another. Accordingly, once assembled with the polarizing electrode 26a, the patterned collector plate 26' forms two independent and interleaved area ion chambers due to the electrically isolated collection regions 26a and 26b. The physical size of the conductors and the rate of change of their physical characteristics of the conductors, such as width for example, are set by practical considerations, such as the ability of existing technology to generate widths of the specified tolerance and limitations on the isolation resistance of electrical surfaces.

In this configuration, a constant electrode plate spacing of 0.5 cm may be used between the polarizing and collection electrodes, and the radiation dose measurement comprises two signals where each of the comb patterns (e.g. each collection region) provide one signal. Other amounts of spacing between the electrode plates 24 and 26' may be used for other embodiments depending on the particular operating parameters. The amount of spacing is selected such that reasonable signals that are detectable are generated. The amount of spacing may not be less than the largest tine width in the patterned collector plate.

The signals from each of the collection regions 26a and 26b due to the portion 19b of the radiation beam 19a incident at a particular location of the sensor 22b depends upon the ratio of the corresponding widths of the interleaved electrode tines that intersect with the incident portion of the radiation beam 19b (i.e. the signal from each collection region is in proportion to the individual summed area of each collection region that is intercepted by the radiation beam). Adjacent tines from each collection region can be considered as a pair of tines, partitioning the signal in proportion to the ratio of the tine width to the total width of the pair of adjacent tines. The variable width of the tines in each pair of tines of the collection regions 26a and 26b across the ion chamber 22c may therefore produce a gradient in ion sensitivity during radiation dose measurement. However, due to the complimentary nature of the pair of collection regions (i.e. when a tine from one collection region is thick and decreasing in width, the tine from the other collection region is thin and increasing in width), one collection region will produce a lower amplitude signal, while the other collection region will produce a higher amplitude signal for an off-axis (e.g. along the direction of the gradient) incident radiation beam.

The tines of the collection regions 26a and 26b may be made using any suitable conducting material and the collection regions 26a and 26b made be mounted on any substrate material that is an adequate insulator. For example, the collection regions 26a and 26b may be formed from etching patterns for these collection regions on a Printed Circuit Board (PCB). Alternatively, the collection regions 26a and 26b may be formed by coating glass plates with a transparent conductive coating for these collection regions. Similarly, collection regions 26a and 26b may be formed by coating Mylar sheets with a thin conductive film such as, but not limited to, aluminum, silver or gold, for example. Other alternative materials may also be used, such as plastics for providing insulation, as well as different methods of manufacture such as, but not limited to, etching and chemical vapor deposition, for example.

In FIGS. 4A and 4B, the regions 27 and 47 both respectively represent a guard region which is an electrically isolated region surrounding the collection electrodes to intercept leakage charge currents that originate from surface contacts. Such a region is shown for clarity on FIGS. 4A and 4B, and these guard regions are implied for the other electrode patterns shown in the other figures applicable to the modified sensor of this application even if they are not implicitly shown in these figures.

Referring now to FIG. 4C, shown therein is an alternative example embodiment of a collector electrode plate 50 having an alternative electrode comb pattern that may be used to achieve a virtual spatial gradient in which separate interleaved sawtooth collection regions 50a and 50b are used. In this example embodiment, the variation in the pattern of conductive regions is from the left to the right in which each pair of tines or fingers includes a portion of the first collection region 50a that decreases in width at a first rate and a portion of the second collection region 50b that increases in width at the first rate such that the overall width comprising these first and second portions is relatively constant. In this example embodiment of the collector electrode plate 50, the pairs of the portions of the first and second collection regions 50a and 50b are arranged horizontally or as rows whereas in the collecting plate 40, the pairs of the portions of the first and second collection regions 40a and 40b are arranged as columns or vertically.

Figure 5:
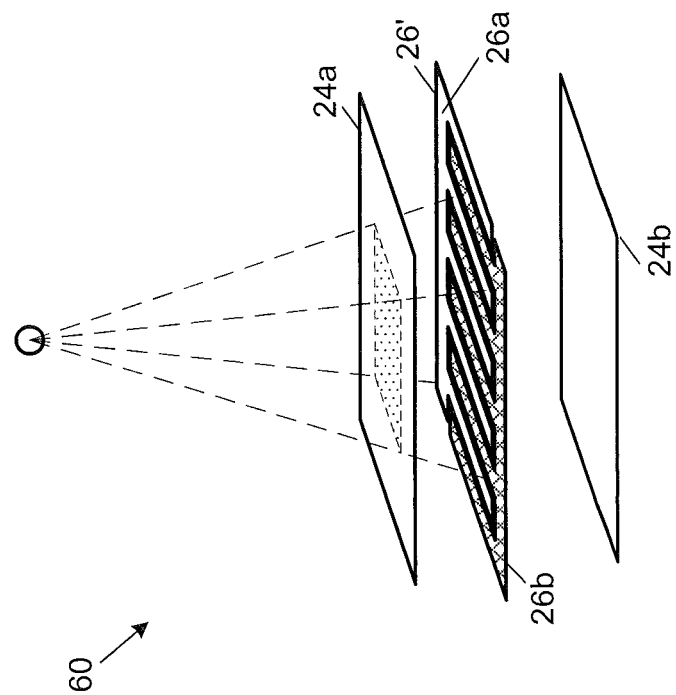
FIG. 5 shows an alternative example embodiment of a modified sensor having ion chambers with a virtual spatial gradient defined using interleaved collection regions on one surface of a collector plate that is located between two polarizing plates in a parallel plate configuration.

Referring now to FIG. 5, in another alternative example embodiment, in accordance with the teachings herein, there is provided a sensor 60 with virtual gradient ion chambers (the electrical components for generating the polarizing voltage and for the measuring current integration are not shown). The sensor 60 comprises two polarizing plates 24a and 24b and one collector plate 26' in which the collector plate 26' is disposed between the two polarizing plates 24a and 24b and all of the plates are parallel to one another. The collector plate 26' has two interleaved collection regions 26a and 26b with patterns that have widths that vary along the length of the collector plate in an inverse fashion to one another (examples of these patterns are shown in FIGS. 4A-4C). Accordingly, while the spacing between the plates is constant, the interleaved collection regions 26a and 26b with the conductive patterns that vary in size across the collector plate 26' provides ion chambers with a virtual volume gradient.

Figure 6A:
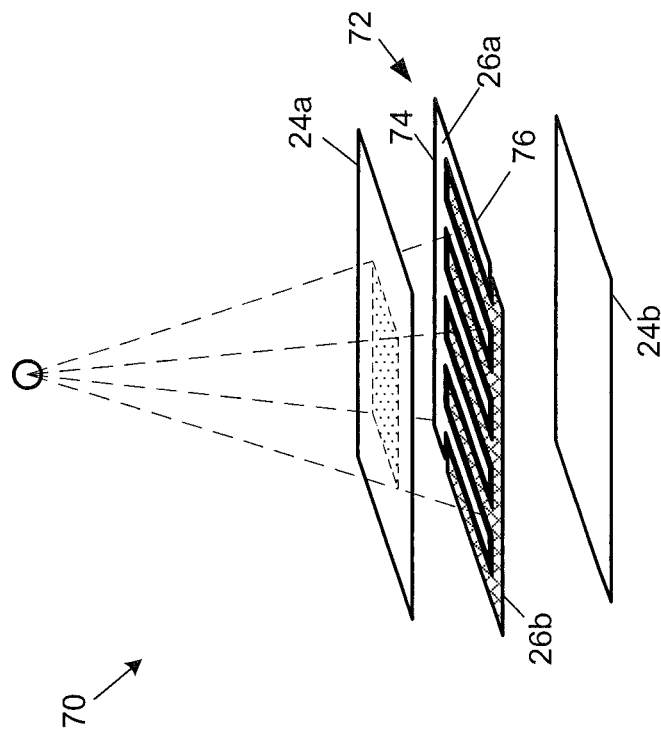
FIG. 6A shows another alternative example embodiment of a modified sensor having ion chambers with a virtual spatial gradient that is defined using interleaved collection regions on two opposing surfaces of a collector plate that is located between two polarizing plates in a parallel plate configuration.

Referring now to FIG. 6A, in another alternative example embodiment, in accordance with the teachings herein, there is provided a sensor 70 with virtual gradient ion chambers (the electrical components for generating the polarizing voltage and for the measuring current integration are not shown for ease of illustration but are used in practice). The sensor 70 comprises polarizing plates 24a and 24b and one collector plate 72 in which the collector plate 72 is disposed between the two polarizing plates 24a and 24b and all of the plates are parallel to one another. A first surface 74 of the collector plate 76 has two interleaved collection regions 26a and 26b with patterns that have widths that vary along the length of the collector plate in an inverse fashion to one another (examples of these patterns are shown in FIGS. 4A-4C). A second surface 76 of the collector plate 72 that is opposite the first surface 74 of the collector plate 72 also has two interleaved collection regions (not shown) with patterns that have widths that vary along the length of the collector plate 72 in an inverse fashion to one another (examples of these patterns are shown in FIGS. 4A-4C). The first surface 72 may be referred to as a top surface of the collector plate 72 and the second surface 76 may be referred to as a bottom surface of the collector plate 72. However, the variation of the patterns of the interleaved collection regions on the first and second surfaces 74 and 76 of the collector plate 72 are orthogonal to one another. This embodiment allows spatial information to be encoded in two orthogonal directions, instead of only along one direction, as well as having four virtual volume gradients that can be used to obtain four signals which may be combined to provide a final radiation dose measurement.

Figure 6F:
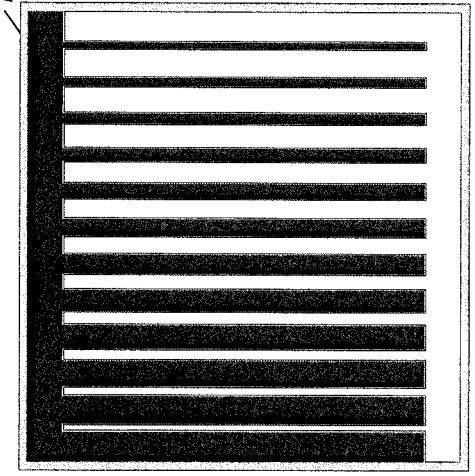
Figure 6F:
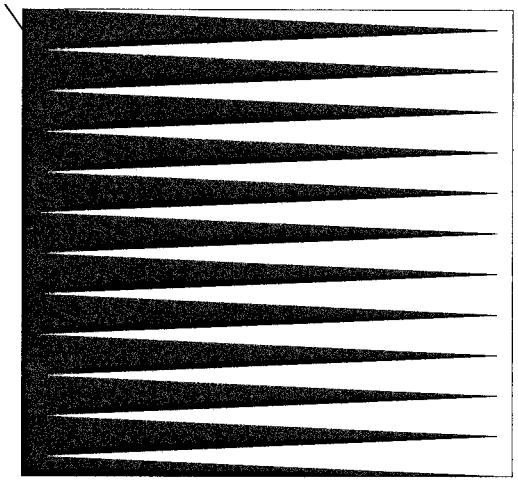
Figure 6E:
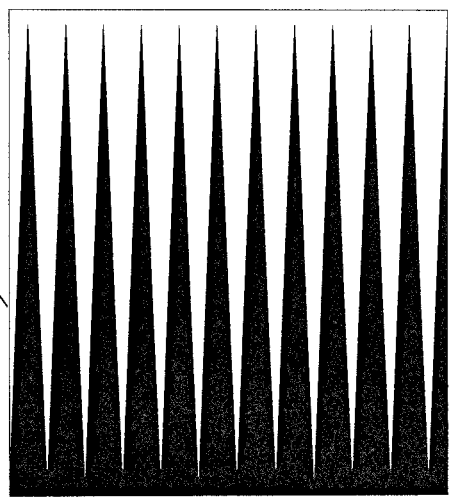
Figure 6E:
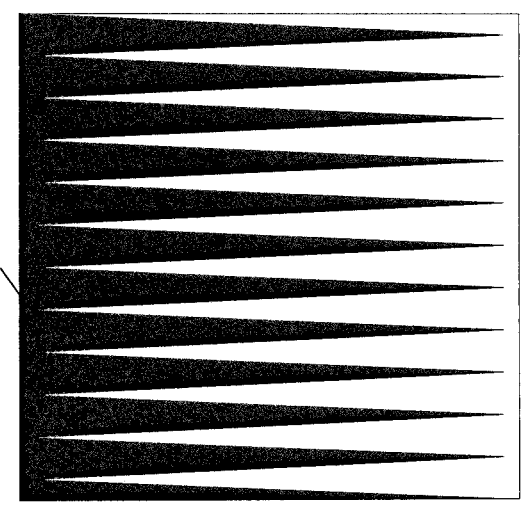
Figure 6D:
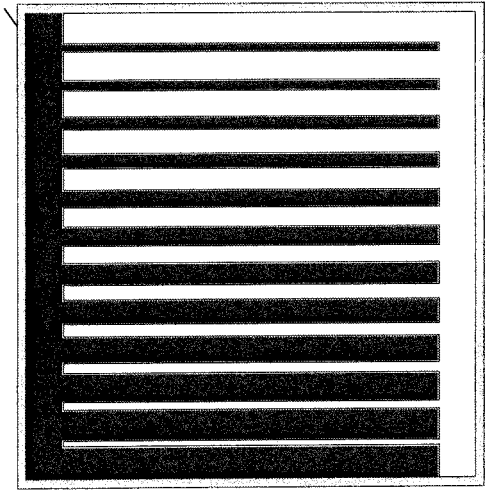
Figure 6D:
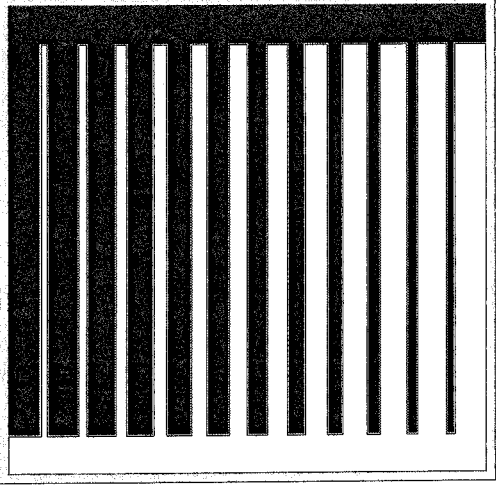

For example, the first surface 74 of the collector plate 72 may have collection regions that are similar to the pattern shown in one of FIG. 4A, FIG. 4B or FIG. 4C while the second surface 76 of the collector plate 74 may have collection regions that have the same pattern rotated 90 degrees (see FIG. 6C, 6D or 6E) or possibly a different amount degrees depending on the pattern on the first surface 74 or may use different patterns on the different surfaces such as FIG. 6F.

As another example, the first surface 74 of the collector plate 72 may have collection regions that are similar to the pattern shown in one of FIG. 4A, FIG. 4B or FIG. 4C while the second surface 76 of the collector plate 72 may have collection regions that are another pattern with a variation in width that is oriented orthogonally with respect to the pattern on the first surface. For example, the first surface 74 of the collector plate 72 may have the collection regions shown in FIG. 4A and the second surface 76 of the collector plate 72 may have the collection regions shown in FIG. 4B or FIG. 4C rotated 90 or 270 degrees. Alternatively, the first surface 74 of the collector plate 72 may have the collection regions shown in FIG. 4B and the second surface 76 of the collector plate 72 may have the collection regions shown in FIG. 4C oriented as shown or rotated 180 degrees.

Referring now to FIG. 6B, in another alternative example embodiment, in accordance with the teachings herein, there is provided a sensor 70' with virtual gradient ion chambers (the electrical components for generating the polarizing voltage and for the measuring current integration are not shown for ease of illustration but are used in practice). The sensor 70' comprises two collector electrode plates 24a' and 24b' in a parallel configuration (i.e. the plates 24a' and 24b' are parallel to one another). The upper surface of the top plate 24a' has been "removed" illustrative purposes so that the bottom surface 76' is visible. The bottom surface 76' has two interleaved collection regions 26a' and 26b' with patterns that have widths that vary along the length of the collector plate in an inverse fashion to one another (examples of these patterns are shown in FIGS. 4A-4C). The opposing collector plate 24b' has an upper surface 77' that is opposite the bottom surface 76' of the collector plate 24a' and also has two interleaved collection regions 27a' and 27b' with patterns that have widths that vary along the length of the collector plate 24b' in an inverse fashion to one another (examples of these patterns are shown in FIGS. 4A-4C). However, the variation of the patterns of the interleaved collection regions on the first and second opposing surfaces 76' and 77' of the collector plates 24a' and 24b' are orthogonal to one another. This embodiment allows spatial information to be encoded in two orthogonal directions, instead of only along one direction, as well as having four virtual volume gradients that can be used to obtain four signals which may be combined to provide a final radiation dose measurement. In this embodiment, the top electrode plate 24a' may be considered to be a polarizing electrode plate with respect to the opposing electrode plate 24b' which is performing the ion collection, and the reverse is also true when considering the top electrode plate 24a' as the collection electrode plate.

It should be noted that the electrical components for generating the polarizing voltage and for the measuring current integration that may be used in the embodiments shown in FIGS. 5, 6A and 6B are a duplication of what is shown in FIG. 3 resulting in the use of 4 meters in total to collect the generated ion signals. The current colleting regions on opposite surfaces of the collector plate electrode (e.g. FIGS. 6A-6F) are also be electrically insulated from each other.

Figure 7A:
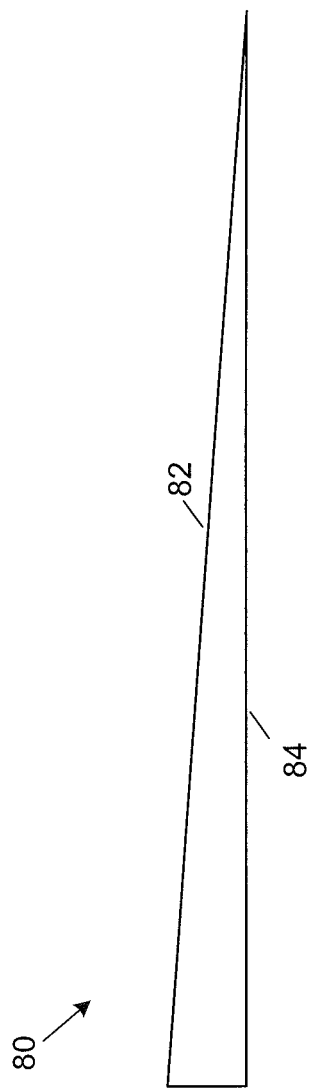
FIG. 7A shows another alternative example embodiment of a modified sensor having ion chambers with a virtual spatial gradient defined using interleaved collection regions on one surface of a collector plate where the polarizing plate is disposed at an angle to the collector plate to also provide a physical spatial gradient in addition to the virtual volume gradient.

Referring now to FIG. 7A, in another alternative example embodiment, in accordance with the teachings herein, there is provided a sensor 80 with virtual and physical gradient ion chambers. The sensor 80 comprises a polarizing plate 82 and a collector plate 84 in which the physical spacing between the polarizing plate 82 and the collector plate 84 varies linearly to provide a first spatial gradient that is a physical spatial gradient and the collector plate 84 has a surface with two interleaved regions (not shown) that are arranged to provide a second spatial gradient which is a virtual spatial gradient examples of which are shown in FIGS. 4A-4C. Accordingly, the two spatial gradients may provide increased signal strength compared to just using one spatial gradient. If a physical spatial gradient and a virtual spatial gradient are combined (in parallel), a signal from one of the virtual gradient ion chambers will be amplified, while for the complimentary virtual gradient ion chamber the signal will be de-amplified (i.e. attenuated). If the physical spatial gradient was oriented perpendicularly with respect to the virtual spatial gradient then this would create 2-D gradient in spatial sensitivity of the detector. A 2D gradient may be useful in verifying shifts of radiation beam aperture in any arbitrary direction. Both of the signals may be used in the measurements.

Figure 7B:
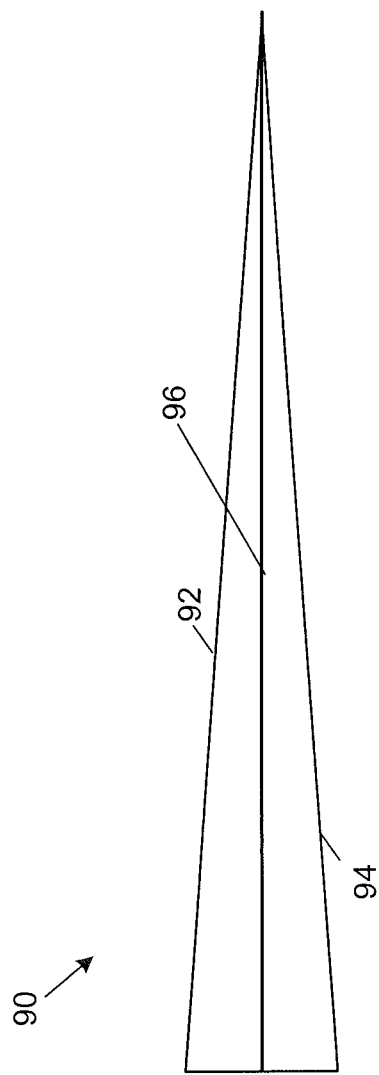
FIG. 7B shows another alternative example embodiment of a modified sensor having ion chambers with a virtual spatial gradient that is defined using interleaved collection regions on two opposing surfaces of a collector plate that is located between two polarizing plates that are both disposed at an angle to the collector plate to provide a physical spatial gradient in addition to the virtual volume gradient.

Referring now to FIG. 7B, in an alternative example embodiment, in accordance with the teachings herein, there is provided a sensor 90 with virtual and physical gradient ion chambers. The sensor 90 comprises two polarizing plates 92 and 94 and a collector plate 96 that is disposed between the polarizing plates 92 and 94 in which the physical spacing between each of the polarizing plates 92 and 94 and the collector plate 96 varies linearly to provide a first spatial gradient which is a physical spatial gradient. The collector plate 96 has a first surface (not shown) with two interleaved regions that are arranged to provide a second spatial gradient which is a virtual spatial gradient. The collector plate 96 has a second surface (not shown) with two interleaved regions that are arranged to provide a third spatial gradient which is another virtual spatial gradient. The patterns of the collection regions on the first and second surfaces of the collector plate 96 are arranged orthogonally with respect to one another. Examples of patterns for the collection regions on the first and second surfaces are given in FIGS. 6C to 6F. The patterns of the collection regions on the first and second surfaces may also be different (e.g. have different shapes) but still provide orthogonal virtual gradients as was described for the collector plate 72. Accordingly, the collector plate 96 is similar to the collector plate 72. The three spatial gradients provide increased signal strength compared to just using one spatial gradient.

It should be understood that in the various example embodiments of the modified radiation sensors described in accordance with the teachings herein that the ion chambers contain an ionizable gas or liquid. In at least some of these example embodiments, the ionizable gas may be air, which may be at room temperature and at room pressure. Accordingly, these ion chambers are unsealed so that the ion chambers are maintained at room pressure. However, in other embodiments, at least one of the ion chambers described in accordance with the teachings herein may be pressurized to be greater than room pressure in order to obtain a larger ion signal during operation. In the former case the measurements can be compensated for pressure and temperature variation. Accordingly, there can be embodiments of the ion chambers that include at least one pressure sensor and temperature sensor where required to compensate for at least one of pressure and temperature, respectively, in the radiation measurements. In addition, in alternative embodiments, a different gas other than air can be used, such as xenon gas and isooctane liquid. Based upon the actual air pressure and temperature, a compensation factor can be calculated, which takes into account the deviation of the mass of the ionizing air from its reference value, and this is applied to the measured signal(s). The fashion in which such a compensation factor is determined is known to those skilled in the art for conventional ion chambers and can similarly be applied to the modified ion chambers described herein.

The modified sensors may have dimensions that are chosen based on the applications in which they are used. For example, for the purpose of monitoring radiation generated by a radiotherapy machine, the effective area of the sensor (i.e. the area of the collector plate having the first and second collection regions) may be on the order of about 26 cm×26 cm and the thickness of the sensors may be on the order of about 1 to 2 cm.

In one aspect, at least one of the modified sensors having virtual gradient ion chambers described in accordance with the teachings herein may be used to determine the positional information of a radiation beam segment in addition to verifying the integrated fluence-area-product.

In another aspect, at least one of the modified sensors having virtual gradient ion chambers described in accordance with the teachings herein may generate a signal pattern specific to any patient treatment field and is sensitive to small shifts/errors, on the order of millimeters, of a radiation beam segment.

In another aspect, at least one of these modified sensors having virtual gradient ion chambers described in accordance with the teachings herein may have no limiting effects on the beam characteristics, and may have a negligible response to backscatter from the patient.

Experimental Methods

Careful fabrication and experiments were performed to determine the performance of ion chambers having a virtual spatial sensitivity gradient in accordance with the patterns for the collection regions shown in FIG. 4A. The sensitivity measurements were made using an Elekta Linear Accelerator, approximately at 70 cm SSD. The sensors with the virtual gradient ion chambers were placed on a treatment couch, and a 2.4×2.4 $cm^2$ radiation field was used for a PCB-based modified sensor while a cylindrical cone with a 1.5 cm diameter was used for a glass plate based modified sensor to obtain relative measurements. The sensitivity profile across the virtual spatial gradient was measured by moving the treatment couch laterally, while delivering radiation beams with constant magnitudes (i.e. constant MUs).

The PCB and glass-based modified sensors with virtual ion chambers (i.e. ion chambers having virtual spatial gradients) were made having the following specifications: the ion chamber itself was defined by collection electrodes spanning a total length of 23 cm and 26 cm on the PCB and glass-based collector boards, respectively, with collection regions having tines varying in width from 0.5 mm to 4.5 mm and interleaved so that paired tines spanned about 6 mm with a gap of 0.5 mm between collection lines. The glass-based sensor had a $TiO_2$ coating on a glass substrate. The air gap between the collector and polarizing electrode plates was nominally about 0.5 cm for both the PCB and glass-based sensors. The polarizing electrode plate had a thickness of 1.7 mm for the PCB-based sensor, while the polarizing electrode plate for the glass-based sensor had a thickness of 2 mm. A bias voltage of 500 Volts was applied between the collector electrode plate and the polarizing electrode plate (other amounts of voltage may be used in other cases up to about 1,000 Volts). Field sizes on the order of 1 to 5 cm$^2$ were investigated, with the modified sensors being moved through the beam to sample chamber positional response.

Test Results

Figure 8B:
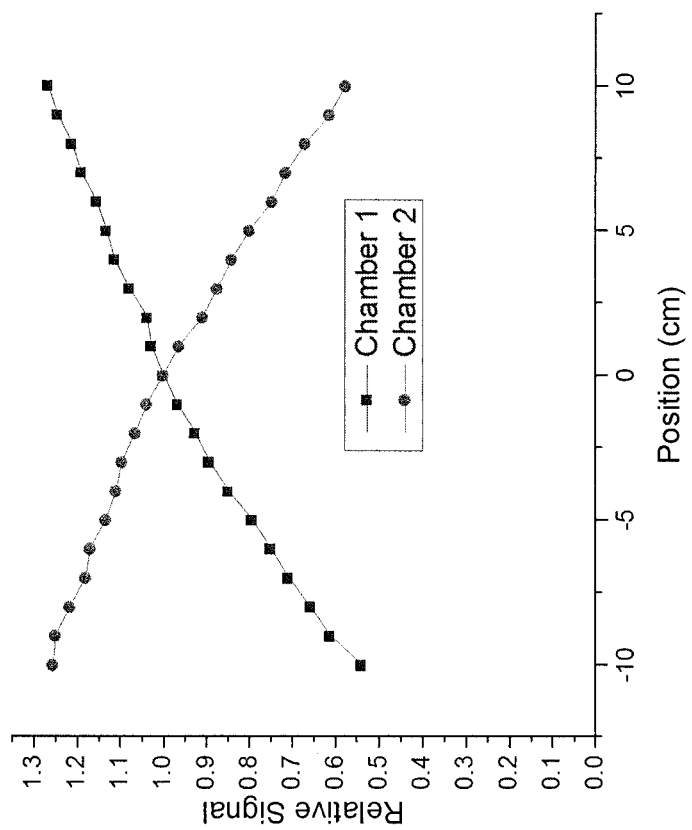
FIG. 8B shows the sensitivity profiles of two complimentary virtual gradient ion chambers of a radiation sensor constructed using insulating glass plates coated with a conductive layer and the size of the radiation beamlet used during testing was a 1.5 cm diameter cone.
Figure 8A:
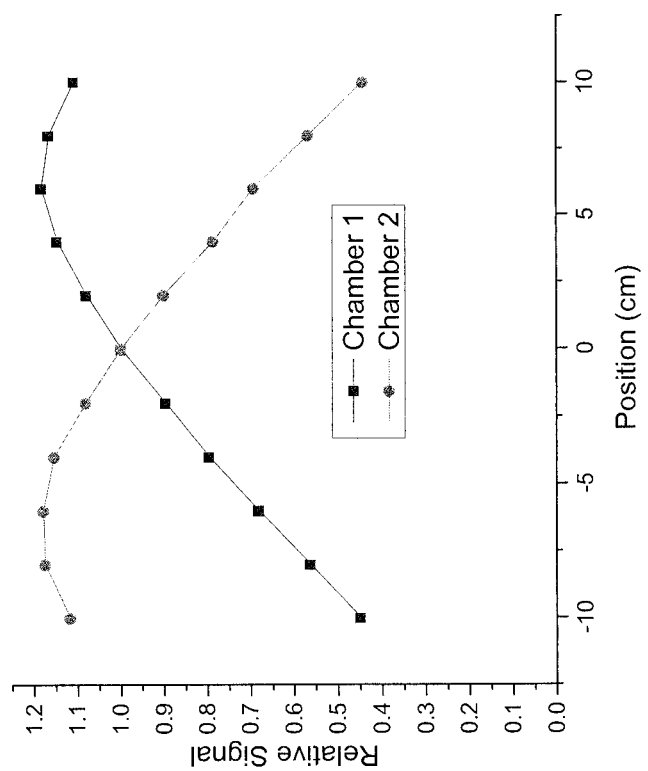
FIG. 8A shows the sensitivity profiles of two complimentary virtual gradient ion chambers of a radiation sensor constructed using a PCB and the size of the radiation beamlet used during testing was 2.4 cm×2.4 cm.
Figure 9:
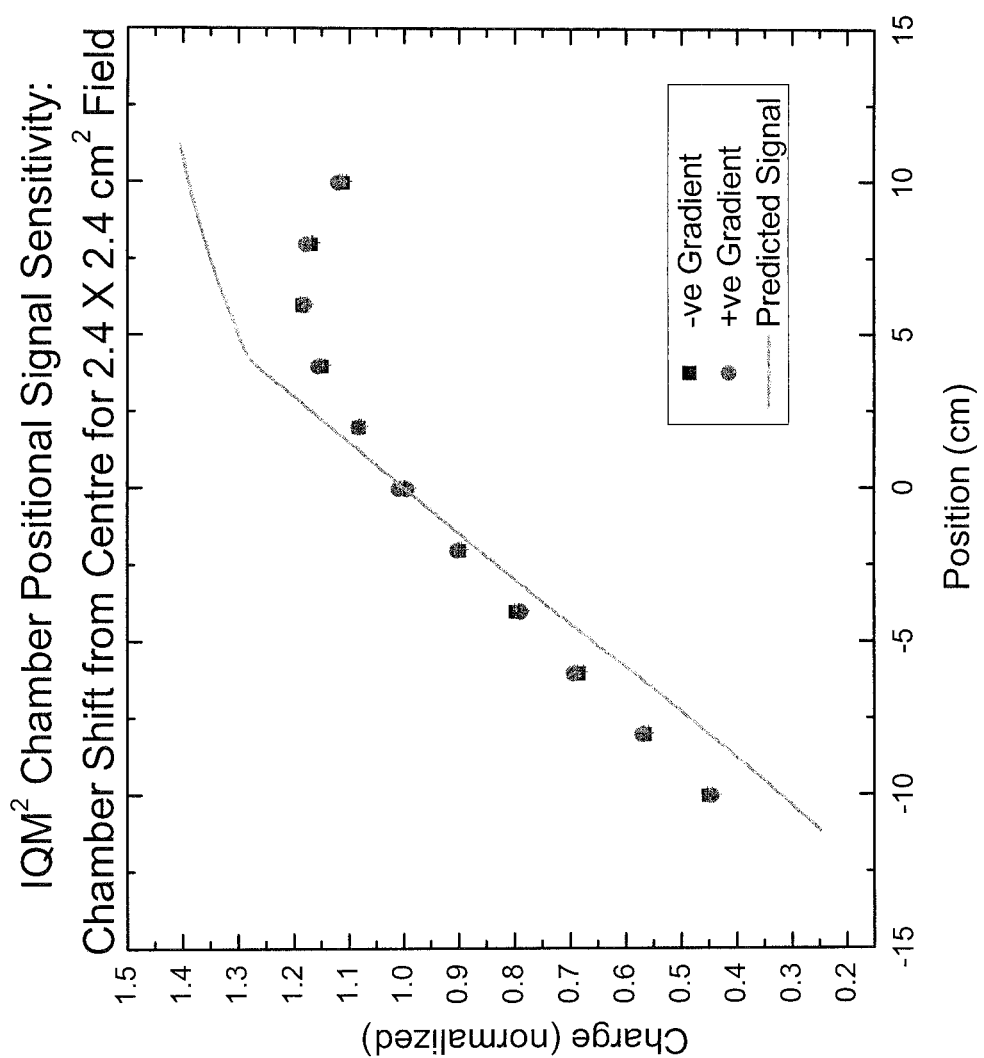
FIG. 9 shows a detector signal as a function of position along the gradient direction for a sensor having virtual gradient ion chambers and the negative gradient signal has been reflected in position for ease of comparison.

Measurements for small fields performed at different positions along the virtual gradient of the ion chambers show the expected positional dependence behavior, with complementary combs exhibiting a mirrored positional response due to the approximately identical & complementary sets of gradients in the sensitivity profiles, as shown in FIG. 8A. Accordingly, when one of the signals has a large or high amplitude the complimentary signal has a small or low amplitude. Similar results were observed with the glass plate-based ion chamber as shown in FIG. 8B. An example of measured and expected gradient responses are shown in FIG. 9. Simple calculations of the expected gradient yield a value of about 0.067 cm$^{-1}$, which compares favourably to the measured gradient of 0.056 cm$^{-1}$ in the linear gradient range.

Accordingly, the test results demonstrate the feasibility of using interleaved comb collection regions on an electrode plate and having a polarizing plate in a parallel plate geometry with the electrode plate to achieve virtual spatial encoding for radiation measurement and therefore radiotherapy treatment monitoring. Comparable signal behavior was achieved for both the PCB and glass based substrates.

It should be noted that since the generated ions travel about the same distance to the collector plate for the embodiments shown in FIGS. 3 to 6G, the quality of the signals that are due to the radiation generated ions is improved and the loss is uniform compared to ion chambers that use a physical gradient between the polarizing and collector plates.

While the applicant's teachings described herein are in conjunction with various embodiments for illustrative purposes, it is not intended that the applicant's teachings be limited to such embodiments. On the contrary, the applicant's teachings described and illustrated herein encompass various alternatives, modifications, and equivalents, without departing from the embodiments described herein, the general scope of which is defined in the appended claims.

REFERENCES

[1] S. Webb, "Optimizing the planning of intensity-modulated radiotherapy", Phys. Med. Biol., 39(12):2229-46, December 1994.

[2] A. L. Boyer, and C. X. Yu, "Intensity-modulated radiation therapy with dynamic multileaf collimators", Semin. Radiat. Oncol., 9(1):48-59, January 1999.

[3] L. E. Reinstein, X. H. Wang, C. M. Burman, Z. Chen, R. Mohan, G. Kutcher, S. A. Leibel, and Z. Fuks, "A feasibility study of automated inverse treatment planning for cancer of the prostate", Int. J Radiat. Oncol. Biol. Phys. 40(1):207-14, January 1998.

[4] C. Burman, C. S. Chui, G. Kutcher, S. Leibel, M. Zelefsky, T. LoSasso, S. Spirou, Q. Wu, J. Yang, J. Stein, R. Mohan, Z. Fuks, and C. C. Ling, "Planning, delivery, and quality assurance of intensity-modulated radiotherapy using dynamic multileaf collimator: a strategy for large-scale implementation for the treatment of carcinoma of the prostate", Int. J. Radiat. Oncol. Biol. Phys. 39(4):863-73, November 1999.

[5] B. Poppe, C. Thieke, D. Beyer, R. Kollhoff, A. Djouguela, A. Ruhmann, K. C. Willborn, and D. Harder, "DAVID—A translucent multi-wire transmission ionization chamber for in vivo verification of IMRT and conformal irradiation techniques", Phys. Med. Biol., 51(5), 1237-1248 (2006).

[6] M. Islam, B. Norrlinger, J. Smale, R. Heaton, D. Galbraith, C. Fan, and D. Jaffray, "An integral quality monitoring system for real-time verification of intensity modulated radiation therapy", Med. Phys. 36(12): 5420, 2009.

[7] S. Venkataraman, K. E. Malkoske, M. Jensen, K. D. Nakonechny, G. Asuni, and B. M. C. McCurdy, "The influence of a novel transmission detector on 6 MV x-ray beam characteristics", Phys. Med. Biol. 54(10), 3173-3183 (2009).

[8] M. Goulet, L. Gingras, and L. Beaulieu, "Real-time verification of multileaf collimator-driven radiotherapy using a novel optical attenuation-based fluence monitor", Med. Phys. 38(3), 1459-1467 (2011).

[9] J. Chang, R. Heaton, R. Mahon, B. Norrlinger, D. Jaffray, Y-B. Cho, and M. Islam, "A method for Online Verification of Adapted Fields Using an Independent Dose Monitor", Medical Physics July 2013; 40(7):07210.

The invention claimed is:

1. A sensor for measuring a radiation dose, wherein the sensor comprises:
   a first polarizing plate electrode;
   an attachment that is configured for mounting the sensor relative to a radiation source such that an ionizing radiation beam generated by the radiation source intersects the first polarizing plate electrode;
   a collector plate electrode spaced apart from the first polarizing plate electrode defining a gap therebetween, the collector plate electrode having a first surface directed towards the first polarizing plate electrode, the first surface comprising a first interleaved collection region and a second interleaved collection region that are electrically isolated from one another;
   a first conductor in the first interleaved collection region, the first conductor increasing in size in a first direction along the first surface of the collector plate electrode to define a first ion chamber that is bounded between the first interleaved collection region and the first polarizing plate electrode with first sampling volumes that vary across the first interleaved collection region in the first direction, the first ion chamber being at ambient pressure or at a pressure greater than ambient pressure;
   a second conductor in the second interleaved collection region, the second conductor increasing in size in a second direction opposite to the first direction along the first surface of the collector plate electrode to define a second ion chamber that is bounded between the second interleaved collection region and the first polarizing plate electrode with second sampling volumes that vary across the second interleaved collection region in the second direction, the second ion chamber being at ambient pressure or at a pressure greater than ambient pressure; and
   an ionizable gas or an ionizable liquid located within the first ion chamber and the second ion chamber;
   wherein the collector plate electrode is operable to detect liberated charges by current integration measured using at least one electrometer, the liberated charges being generated within the first ion chamber and the second ion chamber to provide a first virtual spatial gradient when the sensor is subjected to the ionizing radiation beam due to the first interleaved collection region generating first liberated charge signals resulting from the ionizing radiation beam depositing energy in the first ion chamber and creating first positive and negative ions which drift across the gap in the first ion chamber and the second interleaved collection region generating second liberated charge signals resulting from the ionizing radiation beam depositing energy in the second ion chamber and creating second positive and negative ions which drift across the gap in the second ion chamber, the first positive and negative ions and the second positive and negative ions functioning as charge carriers.

2. The sensor of claim 1, wherein the first sampling volumes of the first ion chamber and the second sampling volumes of the second ion chamber monotonically increase in opposed directions to provide first and second ion signals during use that are complementary to one another and wherein a detection signal for the sensor is based on one of the first and second ion signals or a summation of the first and second ion signals.

3. The sensor of claim 1, wherein the sensor comprises a second polarizing plate electrode and the collector plate electrode is disposed between the first and second polarizing plate electrodes.

4. The sensor of claim 3, wherein the collector plate electrode has a second surface opposite the first surface, the second surface comprising a third interleaved collection region and a fourth interleaved collection region that are electrically isolated from one another and wherein the sensor further comprises:
 a third conductor in the third interleaved collection region, the third conductor increasing in size in a third direction along the second surface of the collector plate electrode to define a third ion chamber that is bounded between the third interleaved collection region and the second polarizing plate electrode with third sampling volumes that vary across the third interleaved collection region in the third direction, the third ion chamber being at ambient pressure or at a pressure greater than ambient pressure;
 a fourth conductor in the fourth interleaved collection region, the fourth conductor increasing in size in a fourth direction opposite to the third direction along the second surface of the collector plate electrode to define a fourth ion chamber that is bounded between the fourth interleaved collection region and the second polarizing plate electrode with fourth sampling volumes that vary across the fourth interleaved collection region in the fourth direction, the fourth ion chamber being at ambient pressure or at a pressure greater than ambient pressure; and
 an ionizable gas or an ionizable liquid located within the third ion chamber and the fourth ion chamber;
wherein the collector plate electrode is operable to detect liberated charges by current integration measured using the at least one electrometer, the liberated charges being generated within the third ion chamber and the fourth ion chamber to provide a second virtual spatial gradient when the sensor is subjected to the ionizing radiation beam due to the third interleaved collection region generating third liberated charge signals resulting from the ionizing radiation beam depositing energy in the third ion chamber and creating third positive and negative ions which drift across the gap in the third ion chamber and the fourth interleaved collection region generating fourth liberated charge signals resulting from the ionizing radiation beam depositing energy in the fourth ion chamber and creating fourth positive and negative ions which drift across the gap in the fourth ion chamber, the third positive and negative ions and the fourth positive and negative ions functioning as charge carriers.

5. The sensor of claim 4, wherein the first direction and the third direction are orthogonal to each other.

6. The sensor of claim 4, wherein the conductors of the first interleaved collection region and the second interleaved collection region have a first shape and the conductors of the third interleaved collection region and fourth interleaved collection region have a second shape, similar to the first shape, and are rotated with respect to the conductors of the first interleaved collection region and the second interleaved collection region to provide an orthogonal relationship therebetween.

7. The sensor of claim 4, wherein the conductors of the first interleaved collection region and the second interleaved collection region have a first shape and the conductors of the third interleaved collection region and the fourth interleaved collection region have a second shape that is different than the first shape.

8. The sensor of claim 1, wherein the first polarizing plate electrode has a second surface opposite the first surface of the collector plate electrode, the second surface comprising a third interleaved collection region and a fourth interleaved collection region that are electrically isolated from one another and wherein the sensor further comprises:
 a third conductor in the third interleaved collection region, the third conductor increasing in size in a third direction along the second surface of the first polarizing plate electrode to define a third ion chamber that is bounded between the third interleaved collection region and the collector plate electrode with third sampling volumes that vary across the third interleaved collection region in the third direction, the third ion chamber being at ambient pressure or at a pressure greater than ambient pressure;
 a fourth conductor in the fourth interleaved collection region, the fourth conductor increasing in size in a fourth direction opposite to the third direction along the second surface of the first polarizing plate electrode to define a fourth ion chamber that is bounded between the fourth interleaved collection region and the collector plate electrode with fourth sampling volumes that vary across the fourth interleaved collection region in the fourth direction, the fourth ion chamber being at ambient pressure or at a pressure greater than ambient pressure; and
 an ionizable gas or an ionizable liquid located within the third ion chamber and the fourth ion chamber;
wherein the first polarizing plate electrode is operable to detect liberated charges by current integration measured using the at least one electrometer, the liberated charges being generated within the third ion chamber and the fourth ion chamber to provide a second virtual spatial gradient when the sensor is subjected to the ionizing radiation beam due to the third interleaved collection region generating third liberated charge signals resulting from the ionizing radiation beam depositing energy in the third ion chamber and creating third positive and negative ions which drift across the gap in the third ion chamber and the fourth interleaved collection region generating fourth liberated charge signals resulting from the ionizing radiation beam depositing energy in the fourth ion chamber and creating fourth positive and negative ions which drift across the gap in the fourth ion chamber, the third positive and negative ions and the fourth positive and negative ions functioning as charge carriers.

9. The sensor of claim 1, wherein the conductors of the first interleaved collection region and the second interleaved collection region form an interdigitated shape where the conductors form pairs of interleaved rectangular tines with each pair of interleaved rectangular tines collectively having a width that is substantially constant along the collector plate electrode and wherein the tines from the first conductor decrease in width across the pairs of tines and the tines from the second conductor increase in width across the pairs of tines.

10. The sensor of claim 1, wherein the conductors of the first interleaved collection region and the second interleaved collection region form an interdigitated shape where the conductors form pairs of interleaved triangles in a sawtooth configuration with each pair of interleaved triangles collectively having a width that is substantially constant along the collector plate electrode.

11. The sensor of claim 1, wherein the plates are arranged in a parallel configuration.

12. The sensor of claim 1, wherein the plates are arranged at an angle to one another to provide a physical spatial gradient in addition to the virtual spatial gradient for the ion chambers.

13. The sensor of claim 1, wherein the gas comprises air.

14. The sensor of claim 1, wherein the sensor comprises at least one of a temperature sensor to obtain temperature measurements for use in performing temperature compensation on the radiation dose measurement and a pressure sensor to obtain pressure measurements that can be used to perform pressure compensation on the radiation dose measurement.

15. A sensor for measuring a radiation dose from an ionizing radiation beam that is generated by a radiation source and is incident upon the sensor during use, wherein the sensor comprises:
 a polarizing plate electrode;
 an attachment that is configured for mounting the sensor relative to the radiation source such that the ionizing radiation beam generated by the radiation source intersects the polarizing plate electrode;
 a collector plate electrode spaced apart from the polarizing plate electrode defining a gap therebetween, and the collector plate electrode having a first surface directed towards the polarizing plate electrode, the first surface comprising a first collection region and a second collection region that are conductive, are electrically isolated from one another, and have a shape with a dimension that changes inversely with respect to one another across a portion of the collector plate electrode;
 a first ion chamber that is bounded between the first collection region and the polarizing plate electrode with a first sampling volume that is linearly varied across the portion of the collector plate electrode, the first ion chamber being at ambient pressure or at a pressure greater than ambient pressure;
 a second ion chamber that is bounded between the second collection region and the polarizing plate electrode with a second sampling volume that is inversely linearly varied across the portion of the collector plate electrode relative to the first sampling volume, the second ion chamber being at ambient pressure or at a pressure greater than ambient pressure; and
 an ionizable gas or an ionizable liquid located within the first ion chamber and the second ion chamber;
wherein the collector plate electrode is operable to detect liberated charges by current integration measured using at least one electrometer, the liberated charges being generated within the first ion chamber and the second ion chamber when the sensor is subjected to an ionizing radiation beam due to the first collection region generating first liberated charge signals resulting from the ionizing radiation beam depositing energy in the first ion chamber and creating first positive and negative ions which drift across the gap in the first ion chamber and the second collection region generating second liberated charge signals resulting from the ionizing radiation beam depositing energy in the second ion chamber and creating second positive and negative ions which drift across the gap in the second ion chamber, the first positive and negative ions and the second positive and negative ions functioning as charge carriers.

16. The sensor of claim 15, wherein widths of the first and second conductors vary inversely with respect to one another across the portion of the collector plate electrode.

17. A method of using a sensor defined according to claim 1 for measuring a radiation dose from an ionizing radiation beam generated by a radiation source, wherein the method comprises:
 mounting the sensor relative to the radiation source such that the ionizing radiation beam intersects the first polarizing plate electrode;
 applying a bias voltage per distance of 1 kV to 2 kV per cm between the first polarizing plate electrode and the collector plate electrode;
 receiving the ionizing radiation beam at the sensor resulting in the generation of the first positive and negative ions within the first ion chamber and the generation of the second positive and negative ions within the second ion chamber;
 maintaining operation of the sensor so that the first positive and negative ions and the second positive and negative ions function as charge carriers;
 measuring the liberated charges using the at least one electrometer; and
 determining the radiation dose based on the liberated charges measured using the at least one electrometer.

18. A method of using a sensor defined according to claim 15 for measuring a radiation dose from an ionizing radiation beam generated by a radiation source, the ionizing radiation beam being incident upon the sensor during use, wherein the method comprises:
 mounting the sensor relative to the radiation source such that the ionizing radiation beam intersects the polarizing plate electrode;
 applying a bias voltage per distance of 1 kV to 2 kV per cm between the polarizing plate electrode and the collector plate electrode;
 receiving the ionizing radiation beam at the sensor resulting in the generation of the first positive and negative ions within the first ion chamber and the generation of the second positive and negative ions within the second ion chamber;
 maintaining operation of the sensor so that the first positive and negative ions and the second positive and negative ions function as charge carriers;
 measuring the liberated charges using the at least one electrometer; and
 determining the radiation dose based on the liberated charges measured using the at least one electrometer.

19. The method of claim 18, wherein the maintaining operation of the sensor so that the first positive and negative ions and the second positive and negative ions function as charge carriers comprises maintaining the bias voltage per distance of 1 kV to 2 kV per cm between the polarizing plate electrode and the collector plate electrode while the first ion chamber pressure and the second ion chamber pressure are at ambient pressure or at a pressure greater than ambient pressure.

20. The method of claim 17, wherein the maintaining operation of the sensor so that the first positive and negative ions and the second positive and negative ions function as charge carriers comprises maintaining the bias voltage per distance of 1 kV to 2 kV per cm between the first polarizing plate electrode and the collector plate electrode while the first ion chamber pressure and the second ion chamber pressure are at ambient pressure or at a pressure greater than ambient pressure.

* * * * *